US010296924B2

(12) United States Patent
Soni et al.

(10) Patent No.: US 10,296,924 B2
(45) Date of Patent: May 21, 2019

(54) DOCUMENT PERFORMANCE INDICATORS BASED ON REFERRAL CONTEXT

(71) Applicant: ADOBE INC., San Jose, CA (US)

(72) Inventors: Sachin Soni, New Delhi (IN); Ashish Duggal, Delhi (IN); Sanjeev Tagra, Haryana (IN); Vineet Sharma, Draper, UT (US); Anmol Dhawan, Ghaziabad (IN); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 936 days.

(21) Appl. No.: 14/445,999

(22) Filed: Jul. 29, 2014

(65) Prior Publication Data

US 2016/0034915 A1 Feb. 4, 2016

(51) Int. Cl.
*G06Q 30/02* (2012.01)

(52) U.S. Cl.
CPC .............................. *G06Q 30/0201* (2013.01)

(58) Field of Classification Search
CPC .................................................. G06Q 30/0201
USPC .......................................................... 707/716
See application file for complete search history.

(56) References Cited

U.S. PATENT DOCUMENTS

| 8,719,255 B1 * | 5/2014 | Pope | G06F 17/30867 |
| | | | 707/716 |
| 9,716,799 B2 * | 7/2017 | Sharma | H04M 3/36 |
| 2006/0229896 A1 * | 10/2006 | Rosen | G06Q 10/1053 |
| | | | 705/321 |
| 2007/0088695 A1 * | 4/2007 | Bleyendaal | G06F 17/30696 |
| 2007/0094042 A1 * | 4/2007 | Ramer | G06F 17/30867 |
| | | | 705/1.1 |
| 2009/0019013 A1 * | 1/2009 | Tareen | G06F 17/30722 |
| 2009/0276378 A1 * | 11/2009 | Boguraev | G06F 17/218 |
| | | | 706/12 |
| 2011/0231223 A1 * | 9/2011 | Winters | G06Q 20/10 |
| | | | 705/7.29 |
| 2014/0258293 A1 * | 9/2014 | Wong | G01C 21/3679 |
| | | | 707/737 |

* cited by examiner

*Primary Examiner* — Mohammad S Rostami
(74) *Attorney, Agent, or Firm* — Shook, Hardy & Bacon L.L.P.

(57) ABSTRACT

A computer-implemented method for providing performance indicators of destination documents includes identifying a referral document to a destination document, where the referral document comprising a source of at least one visitor to the destination document. The method also includes extracting referral keywords from content of the referral document, the referral keywords corresponding to a referral context of the referral document. The method further includes determining a degree of correlation between the referral document and the destination document based on a comparison between the referral keywords and destination keywords, the destination keywords corresponding to destination context of the destination document. Additionally, the method includes providing one or more performance indicators to a user based on the correlation between the referral document and the destination document, where the one or more performance indicators correspond to a performance metric that quantifies interactions between visitors and the destination document.

20 Claims, 7 Drawing Sheets

300a

| Destination Document | Visits | Indicator A | Indicator B | Degree of Correlation | Weighted Indicator A |
|---|---|---|---|---|---|
| 334a | 1,034,223 | 78.17% | 70.00% | 45 | 35.18% |
| 334b | 490,929 | 60.77% | 28.00% | 80 | 48.62% |
| 334c | 513,382 | 78.18% | 20.00% | 20 | 15.64% |
| 334d | 1,032,944 | 6.67% | 6.00% | 73 | 4.87% |
| 334e | 127,339 | 36.74% | 4.00% | 92 | 33.80% |
| 334f | 76,728 | 43.95% | 3.00% | 80 | 35.16% |
| 334g | 51,954 | 43.93% | 3.00% | 12 | 5.27% |

| Destination Document 334a | | | | | |
|---|---|---|---|---|---|
| Referral Document | Visits | Indicator A | Referral Context | Degree of Correlation | Weighted Indicator A |
| 332 | 522,434 | 39.49% | K(1) | 12 | 4.74% |
| 364 | 256,052 | 19.35% | K(2) | 60 | 11.61% |
| 366 | 255,737 | 19.33% | K(3) | 64 | 12.37% |

| Destination Document | Visits | Indicator A | Degree of Correlation | Weighted Indicator A |
|---|---|---|---|---|
| 434a | 511,789 | 38.68% | 62 | 23.98% |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |

DOCUMENT PERFORMANCE INDICATORS BASED ON REFERRAL CONTEXT

BACKGROUND

Web analytics is becoming increasingly valuable in an effort to enhance websites and improve usage thereof. Such information can be valuable to, for example, estimate server load, determine advertising approaches, and identify areas of websites that are in need of redesign. To assist in the collection and analysis of online analytics data, some web analysis tools, such as the ADOBE ANALYTICS tool, have been developed that provide mechanisms to collect information regarding website usage and to manage analysis of the collected data. In this regard, web analysis tools can assist organizations in tracking, measuring, and viewing web analytics data.

Web analytics data can include various performance metrics that are utilized to measure and/or analyze performance of a website, or portion thereof. One commonly used metric to indicate webpage or website performance is a bounce rate. A bounce rate generally refers to a proportion (e.g., percentage, ratio, etc.) of users that enter a webpage within a website, but then navigate away from the website without viewing another webpage within the website. A bounce rate can be very useful for website optimization. For example, bounce rates can provide an indication to a website provider as to which webpages are the most "sticky" and which webpages may need to be revised to engage users to view additional webpages within the website. Because users can arrive at a webpage by any number of different sources (e.g., websites, webpages, etc.), it can be difficult and inefficient for website providers to identify reasons that users tend to enter a particular webpage and, thereafter, navigate away from the website without navigating to another webpage within the website.

SUMMARY

Embodiments of the present invention are directed to providing performance indicators that are generated in accordance with context of a referral or source document. In this regard, context of a webpage or other source from which a user(s) navigates to arrive at a destination webpage is used to determine a performance indicator(s) and/or to provide context in association with a performance indicator(s) associated with the destination webpage. By way of example, and without limitation, a value representing a bounce rate for a particular webpage may account for context of the source from which a user(s) arrived at the destination webpage. Performance indicators for a destination document in accordance with the context of the referral or source document can be provided to users, for example, in analytics reports, to more effectively convey the relevance of the performance indicator to a user, such as a website provider.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 3A depicts an exemplary portion of an analytics report in accordance with implementations of the present disclosure;

FIG. 3B depicts an exemplary portion of an analytics report in accordance with implementations of the present disclosure;

FIG. 4 depicts an exemplary portion of an analytics report in accordance with implementations of the present disclosure;

DETAILED DESCRIPTION

Figure 1:
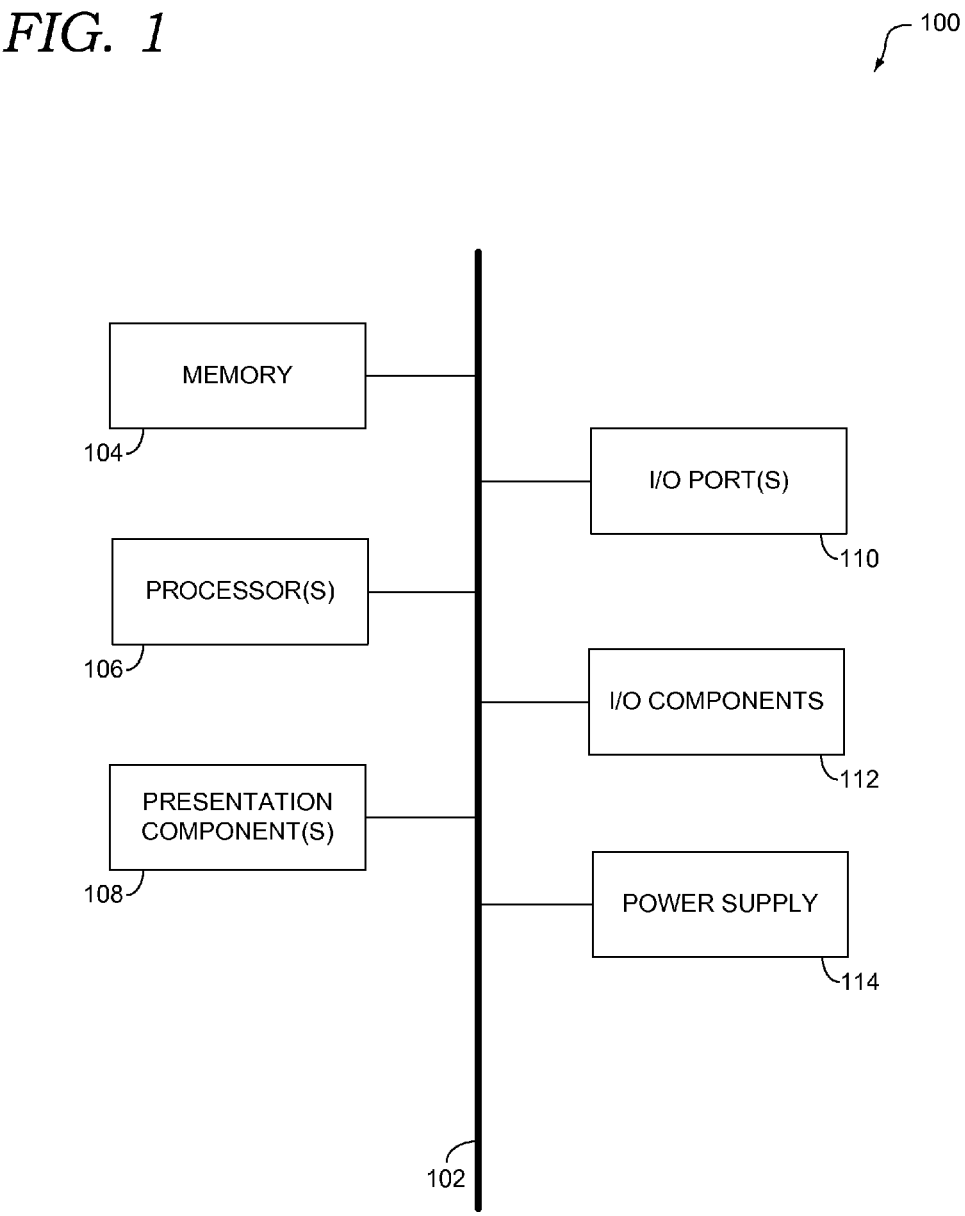
FIG. 1 is a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Website providers frequently use web analytics data to measure the performance of their websites. To assist in the collection and analysis of web analytics data, some web analysis tools, such as the ADOBE ANALYTICS tool, have been developed that provide mechanisms to collect information regarding website usage and to manage analysis of the collected data. Various performance metrics can be used to provide information to a user, such as a website provider. For instance, bounce rates and conversions may be considered by a website provider to generalize strengths and opportunities of a website.

By way of example only, a website provider might recognize a high bounce rate for a particular web page. Because the high bounce rate indicates a lack of user engagement with the website, the website provider may elect to modify the high-bounce webpage in an effort to increase user engagement. In some cases, prior to modifying the high-bounce page, a user may perform an analysis to determine a rationale as to why users are exiting the website without viewing another page. Because users can arrive at a website, or webpage thereof, being analyzed by way of various sources, it can be difficult and tedious to assess the performance of the website in light of the different sources from which users arrived at the website. For instance, in some cases, a bounce rate may be impacted by users arriving at a destination webpage by selecting a link within a website that is not relevant to the destination webpage. Without context provided to the website provider, the webpage might be deemed to be of lower quality and, as such, modified, when modifications are not necessarily required since the visitors may not be concerned with the content of the webpage.

As such, embodiments of the present invention are directed to providing performance indicators in accordance with context of a referral or source document. In this regard, context of a webpage or other source from which a visitor(s) navigates to arrive at a destination webpage is used to provide a performance indicator associated with the destination webpage. By way of example, and without limitation, a value representing a bounce rate for a particular webpage may account for context of the source from which a visitor(s) arrived at the destination webpage. In this manner, a performance indicator may itself be modified to indicate context of the source from which a visitor(s) arrived at the destination webpage. As another example, context of the source webpage from which a visitor(s) arrived at the destination webpage may be provided to a user in association with the corresponding performance indicator. To this end, one or more keywords or a correlation between a source webpage and destination webpage, for instance, can be provided along with a performance indicator for presentation to a user. Performance indicators for a destination document in accordance with the context of the referral or source document can be provided to users, for example, in analytics reports, to more effectively convey the relevance of the performance indicator to a user, such as a website provider.

Having briefly described an overview of embodiments of the present invention, an exemplary computing environment suitable for use in implementations of the present disclosure is provided. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 present data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
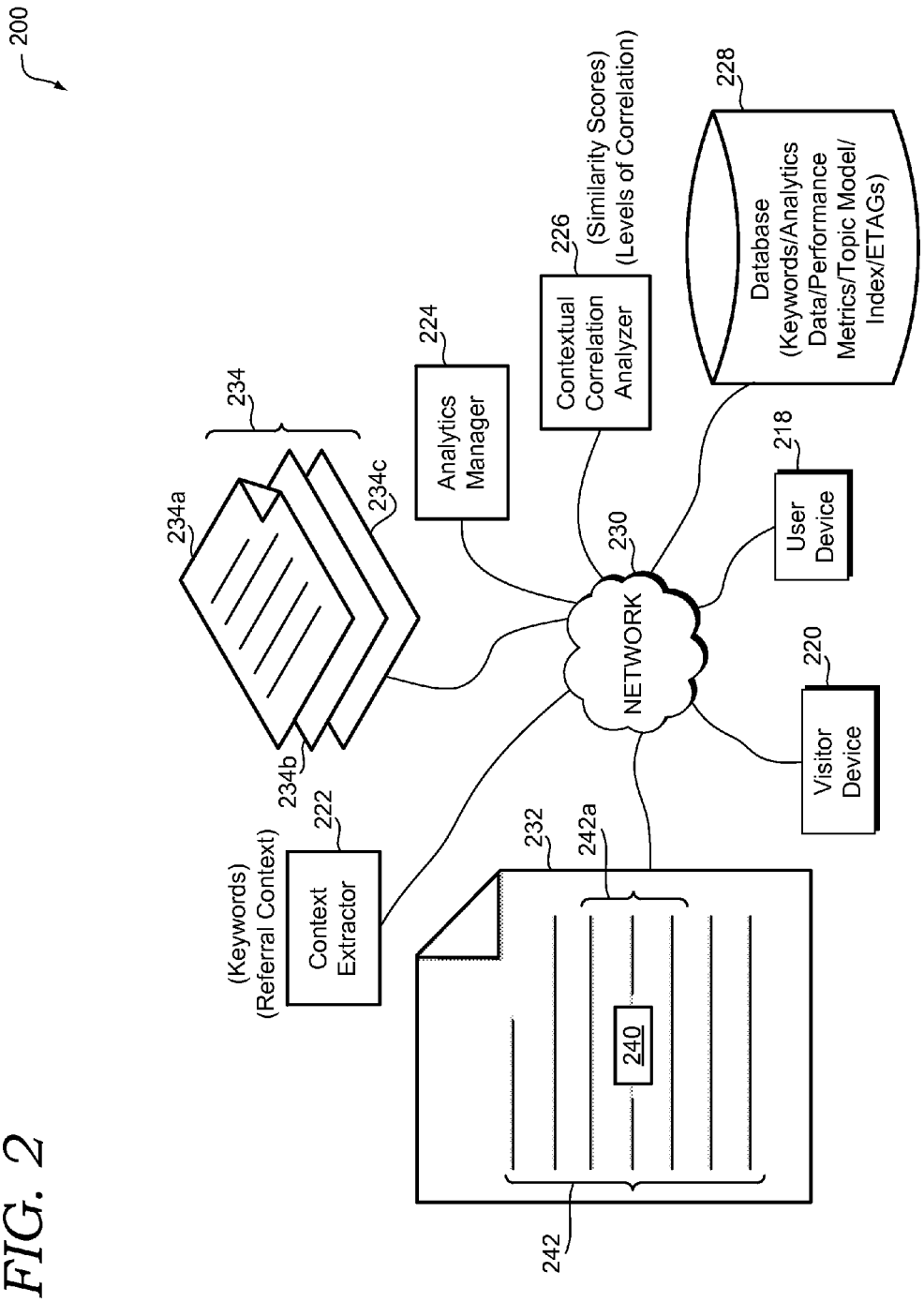
FIG. 2 illustrates an exemplary system in which implementations of the present disclosure may be employed.

Referring now to FIG. 2, FIG. 2 illustrates an exemplary system in which implementations of the present disclosure may be employed. In particular, FIG. 2 shows system 200, which is utilized to provide performance indicators of destination documents. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown, system 200 comprises user device 218, visitor device 220, context extractor 222, analytics manager 224, contextual correlation analyzer 226, and database 228, all communicatively coupled through, for example, network 230.

Network 230 may be wired, wireless, or both. Network 230 may include multiple networks, or a network of networks, but is shown in FIG. 2 in simple form so as not to obscure other aspects of the present disclosure. By way of example, network 230 can include one or more wide area networks (WANs), one or more local area networks (LANs), one or more public networks, such as the Internet, and/or one or more private networks. Where network 230 includes a wireless telecommunications network, components such as a base station, a communications tower, or even access points (as well as other components) may provide wireless connectivity. Although single components are illustrated for the sake of clarity, network 230 enables communication between any number of devices, which can include user device 218. Networking environments are commonplace in offices, enterprise-wide computer networks, intranets, and the Internet. Accordingly, network 230 is not described in significant detail.

Generally, the system 200 is configured to provide performance indicators of destination documents in association with context of a referral document. A performance indicator refers to a value or indication of performance of a document, such as a destination document. A performance indicator can be of any value or quantitative measurement, such as a number, a ratio, a percent, text, or the like. Performance indicators may correspond with any of a number of performance metrics and are not intended to be limited herein.

A performance metric refers to any metric that can be used to measure or indicate performance of a document, such as a destination document. In some embodiments, a performance metric quantifies, describes, or represents interactions between visitors and destination documents. Exemplary performance metrics include, for instance, bounce rate, weighted bounce rate, page views per visit, exit rate, entry page, multi-page visit entry rate, visits per visitor, reload percentage, entry to exit ratio, order conversion, buyer conversion, average order size, conversion rate, time on site, and many more, which include variations, and/or combinations of the above. Although examples provided herein generally refer to a performance metric as being a bounce rate, a performance metric is not limited thereto.

A visitor can correspond to a uniquely identified client that is generating page views or hits on a destination document, or is otherwise visiting a destination document. A uniquely identified client can correspond to a device or an application running on the device (e.g. a user agent such as a browser), or a combination thereof. The client could be identified via a persistent ID, such as a cookie, that has been placed on the device, for example by code of a destination document. Another approach could employ a combination of the device's internet protocol (IP) address and information about the application provided to a web server by the application.

A destination document refers to a document to which a visitor navigated from a referral document. Performance indicators are generally being provided for destination document(s) such that the destination document(s) can be analyzed, for instance, for performance. A referral document refers to a document or source from which a visitor navigated to arrive at a destination document.

Generally, referral documents and/or destination documents can be various types of documents. Some limited examples, include a web document, an email, a word processing document, a music file, a video file, an audio book, a spreadsheet, a presentation, an electronic book, a portable document format (PDF) document, an extensible markup language (XML) document, a hypertext markup language (HTML) document, and so on and so forth. In various implementations, the documents comprise webpages, which are part of websites.

In operation, the system 200 is used to provide one or more performance indicators for one or more destination documents 234 to the user device 218 for display to a user. In accordance with embodiments herein, the performance indicators are provided in accordance with context of referral document 232. A user can correspond to a user account, which may optionally comprise any number of sub accounts. Furthermore, the user can be associated with any number of destination documents for which performance indicators are provided. The user account may be maintained amongst a plurality of user accounts, where the different user accounts may be associated with different destination documents. Furthermore, the plurality of user accounts could be accessible through any number of analysis tools, such as the ADOBE ANALYTICS tool which can provide analytics reports to the users.

Referral document 232 corresponds to a source of at least one visitor to a destination document, such as destination document 234*a*. For example, referral document 232 includes link 240, which, when selected, directs a browser (e.g. a web browser) or other application being employed by visitor device 220 to destination document 234*a*. Link 240 may be a network address, such as a uniform resource locator (URL), which corresponds to destination document 234*a*. Link 240 may be of any form, such as, a banner, text, an advertisement, a video, a clickable object, a redirect, and/or other content embedded in a referral document that provides for a visit to a destination document. In some cases, the grouping of destination documents 234 can correspond to a website, which comprises at least destination documents 234*a*, 234*b*, and 234*c* as webpages. Referral document 232 can also be a part of a website, which is not expressly shown in FIG. 2. Although referral document 232 and grouping of destination documents 234 are shown in FIG. 2, any number of referral and destination documents can be employed by system 200. These documents can be stored in any suitable location or locations, and may be stored with or separately from any of the various components of system 200.

In some implementations, a visitor clicks on link 240, which results in a visit from referral document 232 to the destination document associated with link 240. The visitor thereby initiates an interaction with the destination document. For example, the user views the destination document, engages with content of the destination document, and/or views other destination documents linked to the destination document. These and other interactions between visitors and various destination documents are of interest to administrators, marketers, owners, and/or other parties associated with the destination documents, and may therefore be captured by analytics data.

As an example of the foregoing, website providers may wish to collect data, such as the analytics data shown in database 228, that quantifies interactions of visitors (e.g. a visitor using visitor device 220) to their websites (e.g. 234) and/or webpages (e.g. 234a) within the websites. Such information is valuable to, for example, estimate server load, determine advertising rates, and identify areas of websites that are in need of redesign. The analytics data may be used to measure and analyze performance of a website (e.g. 234) using one or more performance metrics. Performance metrics are used to provide one or more performance indicators to a user (e.g. a user of user device 218) in reports. In doing so, it is desirable that the reports are easily understandable so that the user can effectively assess performance of the websites and/or webpages.

System 200 is employed so as to provide reports for user device 218 and/or other user devices that are easily understandable so that the user can effectively assess performance of any combination of one or more destination documents, such as grouping of destination documents 234 and/or constituents thereof. Although referral and destination documents are described as webpages and/or websites, any of various document types could be employed by system 200.

In various implementations, user device 218 and/or visitor device 220 are computing devices that are capable of accessing the Internet, such as the World Wide Web, for instance, computing device 100 of FIG. 1. As such, either of user device 218 and visitor device 220 might take on a variety of forms, such as a personal computer (PC), a laptop computer, a mobile phone, a tablet computer, a wearable computer, a personal digital assistant (PDA), a server, an MP3 player, a global positioning system (GPS) device, a video player, a handheld communications device, a workstation, any combination of these delineated devices, or any other suitable device.

To provide a performance indicator(s) in accordance with context of a referral document, such as referral document 232, to the user device 218, the context extractor 222, analytics manager 224, and contextual correlation analyzer 226, and database 228 may be utilized. Context extractor 222, analytics manager 224, contextual correlation analyzer 226, and database 228 (also referred to as "components 222, 224, 226, and 228") may reside in association with one or more computing devices, e.g., a server or collection of servers or even user device 218 or visitor device 220. Any or all of the one or more computing devices can be implemented in accordance with computing device 100 of FIG. 1. Although components 222, 224, 226, and 228 are illustrated discretely, one or more of those components may, in fact, be combined or may itself be comprised of multiple components. System 200 is but one exemplary configuration and is not intended to be so limiting.

Though illustrated as a single database, database 228 may, in fact, be a collection of one or more databases and/or other storage means, one or more of which may be stored in association with a server, network, other system components (e.g., user device 218), or other computing devices (not shown). The content of database 228 can be stored in various manners including online or offline and can be in a distributed file system or cloud, as examples. It is therefore noted that the content need not be stored in a database.

In system 200, analytics manager 224 is configured to provide one or more performance indicators to a user of user device 218 in accordance with context of a referral document. In this regard, the analytics manager 224 can determine and/or present the one or more performance indicators to the user, for example, in an analytics report. In this capacity, analytics manager 224 may obtain analytics data, which may be stored in database 228. The analytics data might correspond to referral document 232, grouping of destination documents 234, any of destination documents 234a, 234b, and 234c, and/or other referral and destination documents or groupings of those documents. Analytics data may be accumulated over time as various visitors interact with various destination documents.

Analytics data generally includes any data that corresponds to a variable and is utilized in generating and/or presenting an analytics report. Exemplary analytics data comprises data for performance metrics or otherwise utilized in determining performance indicators. More particularly, some analytics data provides values for variables of performance metrics. Some analytics data also comprises information associated with those values, such as names, network addresses, and/or other indicators of referral documents and/or destination documents that are associated with those values.

Examples of analytics data include numbers of visits, visit duration, a number of visitors who left a destination document without visiting another document in a grouping of destination documents, demographic data of a visitor(s), days since last visit for a visitor(s), day of first visit for a visitor(s), visit source(s) (e.g. a referral document), numbers of visits from a visit source(s), date of first visit for a visitor(s), operating system indication data, browser indication data, screen resolution data, mobile device indication data, device indication data, and many more. Any of this data can be with respect to the one or more of the various documents described herein.

Analytics manager 224 can be used to collect and update the analytics data. In some implementations, in response to a user visiting a destination document, such as destination document 234a, analytics manager 224 collects and/or updates at least some of the analytics data, which may in turn update performance indicators that are generated based on updated analytics data. For example, a visit count is updated for a destination document. Furthermore, a referral document, such as referral document 232 is recorded and/or has a visit count that corresponds to the referral document incremented. Recording a referral document comprises recording an indicator of the referral document, such as a network address that corresponds to the referral document, which can comprise a URL. By collecting and/or updating the analytics data, the analytics data is available to analytics manager 224 for providing at least one analytics report to a user.

The analytics data can be used by the analytics manager 224 to provide one or more performance indicators to a user of user device 218 in accordance with context of a referral document. In this regard, the analytics manager 224 can determine and/or present the one or more performance indicators to the user, for example, in an analytics report. Performance indicators associated with any type of performance metrics may be provided to the user device 218.

Referring now to FIGS. 3A and 3B, FIGS. 3A and 3B depict exemplary portions of an analytics report in accordance with implementations of the present disclosure. In particular, FIG. 3A shows report portion 300a and FIG. 3B shows report portion 300b, any of which is generated and/or presented by analytics manager 224 utilizing analytics data, such as any of the various analytics data described herein. In the implementation shown, report portions 300a and 300b comprise tables. However, other presentation techniques and styles can be employed for report portions in addition to or instead of a table. Examples include one or more pie graphs, charts, diagrams, and the like.

Report portion 300a includes column 348a, having cells indicating destination documents, such as destination documents 334a, 334b, 334c, 334d, 334e, 334f, 334g, and/or other destination documents not shown. Destination documents 334a, 334b, and 334c correspond to destination documents 234a, 234b, and 234c in FIG. 2. The content of those cells correspond to analytics data, such as indicators of corresponding destination documents. Furthermore, other cells in the same row as a cell comprise content corresponding to analytics data, where the content corresponds to the same destination document as the cell.

Report portion 300a also includes column 352a, having cells comprising a number of visits from referral documents to a corresponding destination document over a period of time covered by report portion 300a. For example, as shown, destination document 334a had 1,034,223 visitors, which is provided from the analytics data collected by analytics manager 224.

Report portion 300a also includes columns 350a, 351, and 356a having cells comprising performance indicators with respect to a corresponding destination document in a shared row. In the example shown, destination document 334a has respective performance indicators of 78.17%, 70.00%, and 35.18%. Column 350a comprises performance indicators A corresponding to a first performance metric with respect to destination documents. Column 351 comprises performance indicators B corresponding to a second performance metric with respect to the destination documents. Column 356a comprises correlation weighted performance indicators A corresponding to the first performance metric with respect to the destination documents. The values used to determine those performance indicators may be provided from the analytics data collected by analytics manager 224 and stored in database 228 in FIG. 2.

Although performance indicators A and B and correlation weighted performance indicators A are shown, more or fewer performance indicators can be determined and/or presented by analytics manager 224. As indicated above, the performance indicators correspond to performance metrics, which may be defined in database 228. Exemplary performance metrics include bounce rate, weighted bounce rate, page views per visit, exit rate, entry page, multi-page visit entry rate, visits per visitor, reload percentage, entry to exit ratio, order conversion, buyer conversion, average order size, conversion rate, time on site, and many more, which include variations, and/or combinations of the above.

As previously described, in various implementations, a performance metric employed corresponds to a proportion of visitors to at least one destination document, such as destination document 334a, that carry out at least one predetermined user action on a destination document(s). For example, a predetermined user action may be "bouncing" after viewing only one or a predetermined number of destination documents in a grouping of destination documents in some cases. A bounce may include, for example, clicking on a link to a different grouping of destination documents (e.g. a different website), closing an open window or tab in a browser or other application presenting a destination document, typing and/or entering a network address (e.g. a URL), clicking a "Back" button or other button to leave a grouping of destination documents, or a session timeout.

One example of the foregoing is a bounce rate that corresponds to a ratio between a number of visitors viewing one webpage only of a website upon a bounce to a total number of visitor entries to the webpage. Another example is a weighted bounce rate that corresponds to a product of a bounce rate for a destination document and a ratio between views of the destination document and total views of a plurality of destination documents, such as a grouping of destination documents.

In the example shown, performance indicators A may correspond to bounce rate and performance indicators B may correspond to weighted bounce rate. Thus, for example, of the 1,034,223 visits to destination document 334a (e.g. from referral documents), approximately 808,452 had a visitor bounce without viewing another destination document in a grouping of destination documents. In the present implementation, visits can be incremented regardless of the identity of the visitor. In other implementations, incrementing visits may consider the identity of the user. For example, only visits from unique visitors may be accounted for.

Report portion 300b corresponds to a more detailed report on at least one destination document that corresponds to a row in report portion 300a. While report portion 300b is with respect to destination document 334a, similar report portions may be provided for other destination documents. As shown, the content of a row is with respect to a referral document and destination document 334a. In this regard, report portion 300b includes column 348b, having cells indicating referral documents of destination document 334a, such as referral documents 332, 364, 366, and potentially other referral documents not shown. Referral document 332 corresponds to referral document 232 in FIG. 2. The content of those cells correspond to analytics data, such as indicators of corresponding referral documents. Furthermore, other cells in the same row as a cell comprise content corresponding to analytics data, where the content corresponds to the same referral document as the cell.

Report portion 300b breaks down content of at least some of the similarly labeled columns in report portion 300a with respect to destination document 334a, which includes columns 352b, 350b, 354b, and 356b. Thus, for example, report portion 300b indicates that of the 1,034,223 visits to destination document 334a indicated in report portion 300a, referral document 332 corresponds to a source of 522,434 of those visits.

In accordance with implementations of the present disclosure, one or more performance indicators are provided to a user based on referral context of the referral document. For example, any of the various performance indicators in FIGS. 3A and 3B, and/or other performance indicators are provided to a user based on referral context.

In some respects, a performance indicator may be provided in association with a correlation (e.g. a level of correlation) between referral context of a referral document and destination context of a destination document. As an example, a level of correlation can be presented to a user with one or more performance indicators. In the example shown, the level of correlation corresponds to a degree of correlation, which is indicated in columns 354a and 354b. However, the level of correlation is binary in some cases, whereby one correlation value indicates a high correlation and another correlation value indicates a low correlation.

Further examples of a level of correlation and exemplary approaches to determining a level of correlation are later described herein.

In the example shown, the degree of correlation ranges from 1 to 100 where higher correlation values indicate a higher correlation than lower correlation values. The correlation values are based on a common scale and are derived from a common metric, such that different correlation values are comparable.

A level of correlation is displayed in association with a corresponding destination document. For example, the degree of correlation 45 is shown in the same row as destination document 334a. In this regard, in analyzing an analytics report, a user notices that although destination document 334a had a high bounce rate and weighted bounce rate, the referral documents that contributed to those performance indicators were not particularly relevant to the context of the destination document. Therefore, the user instead chooses to focus attention on destination document 334b, which has a relatively high bounce rate and weighted bounce rate, and a high degree of correlation to its referral documents. In this way, the user's analysis can be more effective and efficient than where an analysis report is based on performance indicators A and B alone.

A level of correlation can be additionally or alternatively displayed in association with a corresponding referral document. For example, the degree of correlation 12 is shown in the same row as referral document 332. In this regard, a user analyzes report portion 300b, where referral document 332 is responsible for the highest portion of the bounce rate for destination document 334a. Despite this, the user chooses to focus attention on referral documents 364 and 366, as respective context of those referral documents have a significantly higher correlation to the destination document than that of referral document 332.

Although the level of correlation is shown as being presented as a number in a table, the level of correlation can be presented and/or displayed in many different ways. For example, levels of correlation are presented to a user without presenting or displaying underlying correlation values in some implementations. As a specific example, the rows in the tables are ranked by degree of correlation without showing correlation values in some cases. As another example, a color code is used that corresponds to levels of correlation or heights in a graph indicate relative correlation values in some scenarios. Furthermore, the levels of correlation are presented as ranges of correlation values in some reports.

In addition to or instead of presenting levels of correlation to a user, aspects of the present disclosure relate to one or more performance indicators being provided to a user based on referral context of a referral document where the one or more performance indicators are adjusted based on the aforementioned correlation (e.g. levels of correlation). For example, the values of the one or more performance indicators are weighted by or otherwise changed based on the level of correlation. In the implementation shown, column 356a comprises correlation weighted performance indicators A, which are calculated by multiplying performance indicators A by degrees of correlation and dividing the product by 100. For example, for destination document 334a, the correlation weighted performance indicator of 38.18% is calculated as 78.17%*45/100. Column 356b also comprises correlation weighted performance indicators A, which are with respect to a corresponding referral document.

By adjusting performance indicators based on levels of correlation, the performance indicators relate contextual relevance of referral documents to a user in an effective and efficient manner. As correlation weighted indicators A relate similar information to the user as performance indicators A and the degrees of correlation, at least some of their content can be omitted from report portions 300a and/or 300b.

Only performance indicators A are shown as being correlation adjusted or weighted. However, performance indicators B and/or other performance indicators that are based on various performance metrics are also adjusted or weighted in some implementations. Therefore, the contextual relevance of referral documents may be incorporated into a variety of performance indicators, any of which are provided to a user.

In addition to or instead of aforementioned aspects of the present disclosure, some aspects of the present disclosure relate to one or more performance indicators being provided to a user based on excluding at least one referral document from the one or more performance indicators in accordance with a degree or level of correlation. In this regard, when a referral document falls below a threshold level of relevance or correlation to a destination document, data associated with visits of the destination document by way of the referral document can be excluded from determining or calculating a performance indicator(s).

By way of example, and with reference to FIG. 4, FIG. 4 depicts an exemplary portion of an analytics report in accordance with implementations of the present disclosure. In particular, report portion 400 of an analytics report is shown, which is similar to report portion 300a. Report portion 400 is provided in addition to or instead of report portion 300a. Report portion 400 comprises columns 448, 452, 450, 454, and 456 and destination document 434a corresponding respectively to columns 348a, 352a, 350a, 354a, and 356a and destination document 334a in report portion 300a.

In report portion 400, referral document 332 has been excluded from the performance indicator A and the correlation weighted performance indicator A of destination document 434a based on the level of correlation between referral document 332 and destination document 434a. Thus, for example, visits, bounces, and/or other contributions of referral document 332 have been excluded from the performance indicator A and the correlation weighted performance indicator A. Referral document 332 is excluded from any to all of the various performance indicators that are provided to a user. Furthermore, any of various referral documents may similarly be excluded from other performance indicators for any of the various destination documents.

By excluding at least one referral document from one or more performance indicators based on a degree or level of correlation, the user can more effectively and efficiently analyze performance indicators in an analytics report. In some implementations, a referral document(s) is excluded based on a threshold level or degree of correlation. For example, referral documents having a degree of correlation below 20 are excluded in report portion 400a. Thus, for example, referral document 332 is excluded, while referral documents 364 and 366 are included. The threshold level or degree of correlation may be shared between multiple destination documents, for example, shared within a report portion or global to an analytics report. In some implementations, the threshold level or degree of correlation is user configurable and/or adjustable.

A report portion or analytics report is optionally adjusted and presented dynamically as changes are made to the threshold level or degree of correlation. A referral document may be excluded based on other factors in addition to or instead of being based on the threshold level or degree of correlation. For example, a user may input a request to exclude at least one referral document. As a more specific example, the user notices that referral document 332 is not particularly relevant based on any of the various information related by an analytics report and therefore inputs the request to exclude. While exclusion is described with respect to report portions 300a and 400, similar exclusions can be made from report portion 300b. In this respect, excluded referral documents are generally not displayed and/or reflected by report portion 300b.

In addition to or instead of aforementioned aspects of the present disclosure, some aspects of the present disclosure relate to one or more performance indicators being provided to a user where the providing comprises displaying at least a portion of referral context of a referral document in association with one or more performance indicators. Referral context is extracted from a referral document, for example, by analytics manager 224 of FIG. 2. Displaying at least some referral context of a referral document in association with one or more performance indicators that are based on the referral document allows for a user analyzing a report portion to view the one or more performance indicators with some context that aids in analysis.

For instance, referring again to FIG. 3B, report portion 300b comprises column 362, having cells comprising referral context extracted from corresponding referral documents. For example, referral context K(1) is extracted from referral document 332, referral context K(2) is extracted from referral document 364, and referral context K(3) is extracted from referral document 366. A user analyzing report portion 300b inspects referral context K(1) and concludes that the corresponding performance indictor A is not particularly relevant to destination document 334a. The user therefore chooses to focus on referral documents 364 and 366. The user optionally provides a request to exclude referral document 332 from report portion 300a and/or 300b and/or adjust a threshold level or degree of correlation until referral document 332 is no longer included. In addition or instead, the user access a link to view referral document 332, which is included in the analytics data and presented in the analytics report for further inspection.

Examples of displayed referral context include screenshots of referral documents, keywords extracted from referral documents (e.g. referral keywords), portions of text of referral documents, embedded objects of referral documents, such as pictures or videos, metadata of referral documents, and/or other contextual information that is extracted from a referral document. In some implementations, at least some of the referral context is viewable by a visitor to the referral document in a browser or application utilized by the visitor.

In addition to or instead of displaying referral context, some analytics reports display destination context of any of the various destination documents. This is accomplished in a similar manner and corresponds to similar types of contextual information as referral context, as described herein.

Based on the foregoing, it is apparent that any combination of the aforementioned approaches can be employed so as to allow a user to effectively and efficiently analyze analytics data. For example, the aforementioned approaches can be used to relate referral context to a user, thereby enhancing document performance indicators.

Irrespective of the approach used to provide performance indicators in association with context of a referral document(s), an analytics report can be provided by the analytics manager 224 to a user, for example, on user device 218. For example, one or more presentation components 108 of FIG. 1 are utilized for this purpose. The user analyzes the analytics report to, for example, identify areas of websites or other groupings of destination documents that are in need of redesign. For example, the user sees that destination document 334a of FIG. 3 has near the highest bounce rate and the highest weighted bounce rate of the destination documents in report portion 300a of FIG. 3.

As previously described, a correlation between a destination document and a referral document(s) leading to the destination device may be used for determining or generating a performance indicator(s) or to present along with a performance indicator(s). To determine such a correlation, the context extractor 222 and the contextual correlation analyzer 226 may be utilized.

As such, in some respects, the present disclosure relates to extracting referral context of a referral document from content of the referral document and/or extracting destination context of a destination document from content of the destination document. For example, referring again to FIG. 2, context extractor 222 is configured to perform these functions, which are also performed in association with other components, such as analytics manager 224.

The referral context is extracted by identifying a referral document to a destination document, where the referral document comprises a source of at least one visitor to the destination document. In particular, analytics manager 224 is configured to identify referral documents to a destination document, which are utilized for various purposes, such as for extraction of referral context. The identification is accomplished utilizing one or more scripts, applications, code, and/or other components. In some implementations, any of these various components at least partially are embedded in the destination document, such as in the source code of the destination document.

In some implementations, the identification is based on a visit to the destination document. For example, analytics manager 224 detects a visit to the destination document. However, the identification need not be based on a visit. The identification comprises receiving a network address of the referral document, such as a URL. Based on the identification and/or visit, context extractor 222 extracts the referral context of a referral document from content of the referral document, for example using the network address or anther referral document indicator to access the referral document and/or content from the referral document. If database 228 does not comprise destination context of the destination document, the destination context also optionally is extracted based on the identification and/or visit.

Based on the identification, analytics data corresponding to the visit is recorded and/or updated in database 228. Also, where referral context has already been extracted from the referral document, the extraction may or may not be performed in response to the identification. For example, the referral context may already be in database 228 from a prior identification or otherwise. In some cases, the referral context was in database 228 based on a prior visit to the destination document or another destination document.

Thus, it will be appreciated that database 228 optionally comprises referral context and destination context from various referral documents and/or destination documents, which are accumulated and updated over time. However, in doing so, it is not always guaranteed that that referral context and/or destination context being stored still corresponds to live documents whose content has changed. For example, the content of some webpages change over time. This could result in different referral or destination context. Thus, any of the stored referral context and/or destination context is updated over time. In some implementations, an entity tag (ETag) or validation tag is received and is compared to a stored entity or validation tag in database 228 so as to determine whether the content of a referral or destination document has changed. The stored referral and/or destination context is updated in response to a change.

The change is indicated to a user, for example, in an analytics report. In some implementations, the change is indicated based on a level of correlation between referral context of a changed referral document and destination context. For example, the change is indicated based on the level of correlation exceeding a threshold value. In other words, the change is indicated for referral documents presented as having a relatively high level of correlation. This is useful where some of the analytics data corresponds to the referral document prior to the change and other of the analytics data corresponds to the referral document after the change. In implementations where the pre and post change analytics data are distinguishable, for example, based on time stamps or otherwise, related performance indicators can be broken down by pre and post change. Pre and post change analytics data can also be averaged for performance indicators.

As an example, in FIG. 2, referral document 232 has content 242, which corresponds to content that is viewable to a visitor of referral document 232 using a browser (e.g. a web browser) or application utilized to view referral document 232. Context extractor 222 is configured to extract referral context from content 242 of referral document 232. In some implementations, context extractor 222 is configured to determine one or more portions of content 242 from which to extract referral context. For example, context extractor 222 only extracts referral context from portion 242a and/or other portions of content 242, or favors these portions in the extraction based on a determination.

In some implementations, portion 242a is determined in the extraction based on link 240 to destination document 234a, for example, based on being in a vicinity of link 240. This determination defines portion 242a as corresponding content within a designated position with respect to link 240. For example, a designated distance before and/or after link 240. As an example, where content 242 comprises text, portion 242a is determined to comprise text that is a designated number of words or characters before and/or after link 240. In these and optionally other ways, context extractor 222 determines the scope of the content of a referral document. In some implementations, context extractor 222 extracts referral context from content 242 without regard to a link or portions of the content. For example, extraction is based on all of visible text in referral document 232 in some cases. Referral context can be extracted from any content embedded in referral document 232. The extraction could be from video, pictures, and/or text.

In some implementations, the context extractor 222 can generate keywords from the content. The keywords are generated so as to correspond to the referral context of the referral document, and more particularly, to be representative of the content (e.g. portions of the content) of the referral document from which they are extracted.

In generating keywords, context extractor 222 may employ any of various natural language processing techniques to process text provided from content 242. These include, but are not limited to tokenization, stemming, lemmatization, part-of-speech tagging, and so on and so forth. Raw text, and/or other text provided from content 242 is normalized utilizing these techniques. The processing of the text comprises identifying nouns and/or proper nouns from content 242, which are included in the keywords based on their classification.

While the processed text can be the viewable text described above, the processed text can also comprise non-viewable data, such as metadata, tags, and the like. Furthermore, the processed text could be extracted from videos, images, audio, and/or other media embedded in referral document 232. This is accomplished, for example, utilizing any of various image-to-text, video-to-text, and/or audio-to-text processing techniques.

The referral context, such as the keywords extracted from the referral document are compared to destination context, such as keywords extracted from a destination document. The destination context is extracted in any of the various manners described with respect to the referral context. However, the destination context optionally is provided in other manners. In some implementations, the destination context is provided by a user. For example, a user provides a list of keywords or other items as the destination context. In some implementations, the user provides a topic model associated with the destination document, or a topic model is generated from the destination document. The topic model is utilized in the natural language processing, which is employed by context extractor 222.

Upon extracting context, the contextual correlation analyzer 226 may perform a comparison of such extracted context. Contextual correlation analyzer 226 can receive the referral and destination context and provide a similarity score, a level of correlation, a degree of correlation, and/or other data based on the comparison. This data may be stored in database 228 for use in determining and/or displaying performance indicators, for example, by analytics manager 224.

While only referral document 232 is shown in FIG. 2, context extractor 222 and contextual correlation analyzer 226 may perform any of the aforementioned functions on any number of destination and referral documents. For example, referral context may be extracted from many different referral documents and destination context may be extracted from many different destination documents. The various referral and document contexts are compared to one another to generate various levels or correlation with respect to various combinations of the referral and destination documents, which are utilized for analytics reports.

As an illustrative example, context extractor 222 extracts first, second, and third referral context from respective first, second, and third referral documents, one of which is referral document 232. Context extractor 222 also extracts destination context from a destination document, such as destination document 234a. The first, second, and third referral context and the destination context are provided to contextual correlation analyzer 226 at any time, as needed for comparison to generate a level of correlation. The first referral context is compared to the destination context to generate a first level of correlation, the second referral context is compared to the destination context to generate a second level of correlation, and the third referral context is compared to the destination context to generate a third level of correlation.

The document context described above is provided to contextual correlation analyzer 226 as a vector or list of keywords and/or keyword frequencies. As an example, a vector for the first referral context comprises (6, 6, 1, 1, 5, 0, 4, 0, 5, 1, 0, 5), a vector for the second referral context comprises, (0, 3, 3, 0, 0, 0, 0, 0, 0, 2, 0, 0), a vector for the third referral context comprises (0, 1, 0, 0, 0, 0, 0, 0, 0, 1, 4, 0, 0), and a vector for the destination context comprises (7, 5, 4, 4, 4, 3, 3, 3, 3, 2, 2, 2).

Each number in the above example corresponds to a frequency of a keyword in referral context. Thus, it can be seen that a keyword with a frequency of 7 in the destination context has frequencies of 6, 0, and 0 in the first, second, and third referral context respectively. Although the example shown includes 12 keywords, any number of keywords can be employed. In the present example, determining a degree or level of correlation is based on frequencies of the keywords in referral context (i.e. referral keywords) as compared to frequencies of the keywords in destination context (i.e. destination keywords).

The contextual correlation analyzer 226 utilizes any of various approaches to compare the referral context and the destination context. Suitable approaches include, but are not limited to basing a level of correlation on a Jaccard similarity coefficient or a cosine similarity score. In the example, above, the first, second, and third referral context have cosine similarity scores of 0.827439588216, 0.50690420363, and 0.180325176568 respectively with respect to the destination context, which form the basis of respective levels of correlation. It can therefore be seen that the first referral document has the highest level of correlation with the destination document and the third referral document has the lowest level of correlation with the destination document.

Thus, contextual correlation analyzer 226 determines a degree of correlation between a referral document and a destination document based on a comparison between referral keywords and destination keywords. The destination keywords correspond to destination context of the destination document and the referral keywords correspond to referral context of the referral document. However, comparisons are optionally based on other factors in addition to, or instead of keywords. Generally, any of various document comparison techniques can be employed.

ADDITIONAL EXAMPLES

Additional exemplary methods are described below. Each block of the methods and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a web analytics tool, such as the ADOBE ANALYTICS tool.

Figure 5:
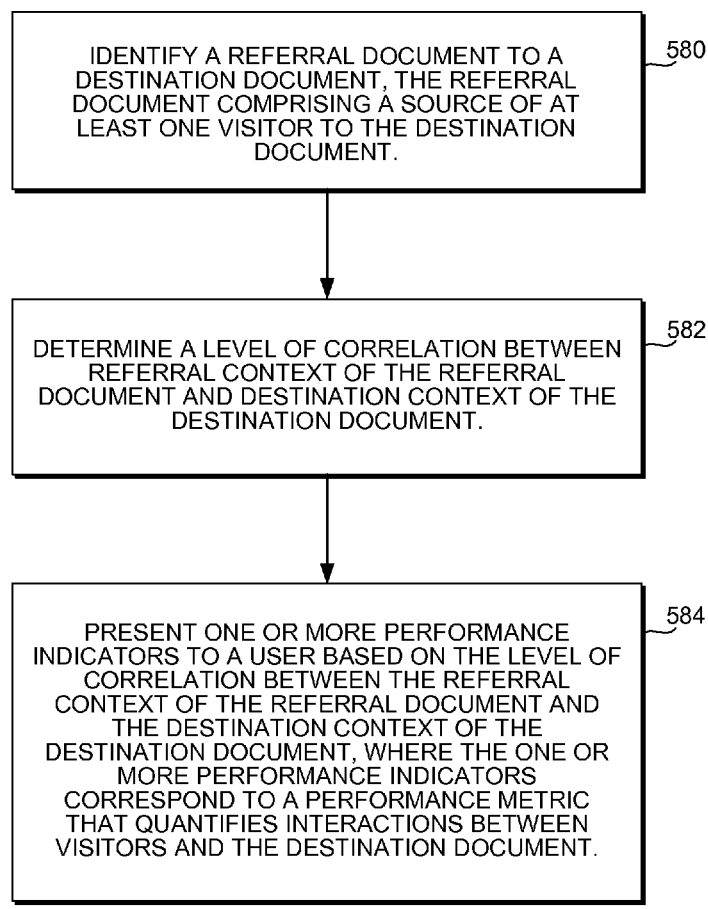
FIG. 5 depicts a flow diagram of an exemplary method for providing performance indicators of destination documents in accordance with implementations of the present disclosure.

Referring now to FIG. 5, FIG. 5 depicts a flow diagram of an exemplary method (e.g. 500 in FIG. 5) for providing performance indicators of destination documents in accordance with implementations of the present disclosure. The method includes identifying a referral document to a destination document, the referral document comprising a source of at least one visitor to the destination document (e.g. 580 in FIG. 5). In one example, a visitor on visitor device 220 clicks on link 240, which causes a browser running on visitor device 220 to visit destination document 234a from referral document 232. Based on the visit, analytics manager 224 identifies referral document 232 as a source to destination document 234a by the URL of referral document 232.

Based on the identification, analytics manager 224 finds the URL corresponding to referral document 232 in database 228 and updates analytics data corresponding to referral document 232 and destination document 234a by updating a visit count in database 228 that tracks a number of visits to destination document 234a from referral document 232.

The method also includes determining a level of correlation between referral context of the referral document and destination context of the destination document (e.g. 582 in FIG. 5). In the example above, referral context of referral document 232 may be stored in database 228 based on a prior visit of a different user to a different destination document than destination document 234a from referral document 232. Furthermore, destination context of destination document 234a may be stored in database 228 by a configuration routine of an analysis tool that is accessed by a user of user device 218 and employs system 200 for providing analytics reports to the user.

The method further includes providing one or more performance indicators to a user based on the level of correlation between the referral context of the referral document and the destination context of the destination document, where the one or more performance indicators correspond to a performance metric that quantifies interactions between visitors and the destination document (e.g. 584 in FIG. 5). In the example described above, an analytics report is generated by the analytics tool and is presented to the user on user device 218. The analytics report includes report portion 300a, which includes performance indicators A in column 350a and degrees of correlation in column 354a. In another example, the analytics report includes report portion 400, which excludes some referral documents from performance indicators A based on degrees of correlation of those referral documents.

Figure 6:
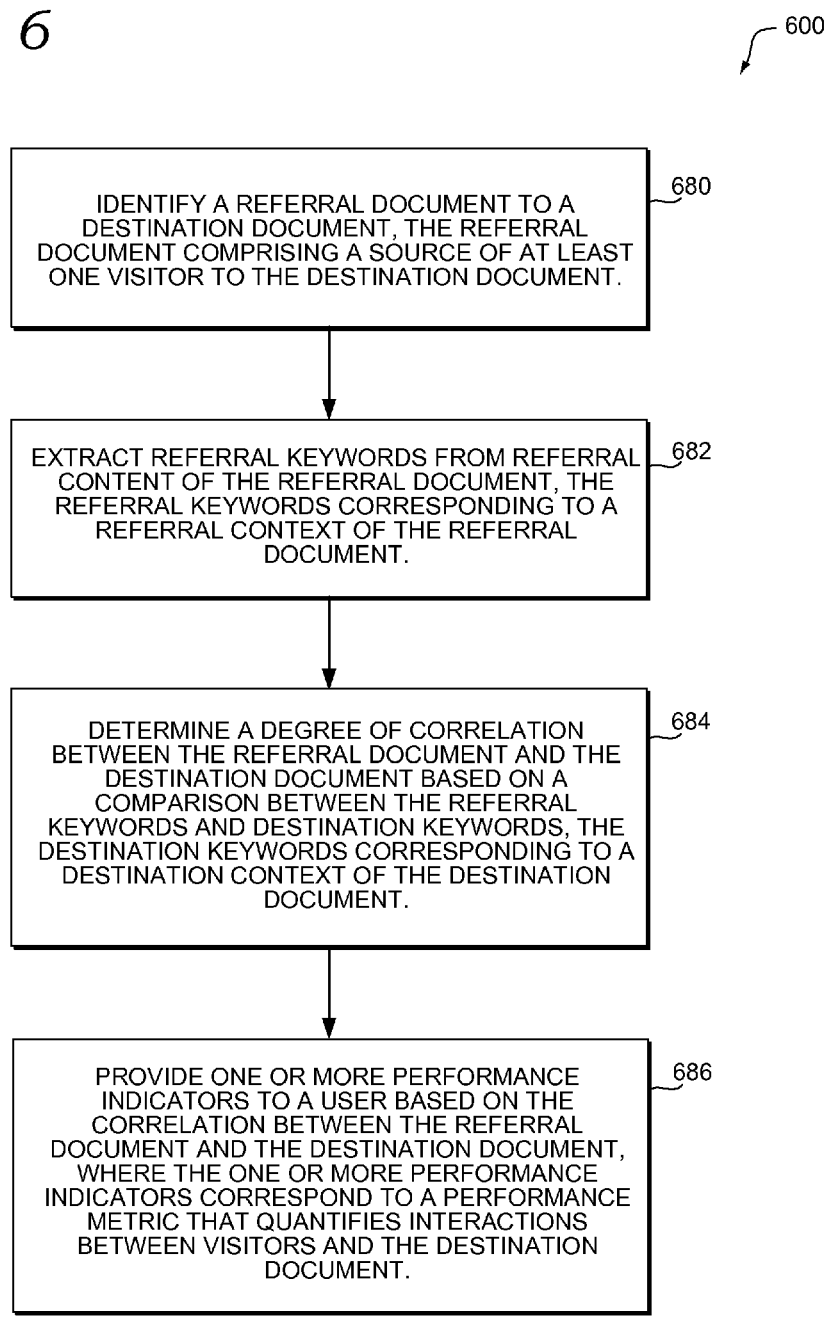
FIG. 6 depicts a flow diagram of an exemplary method for providing performance indicators of destination documents in accordance with implementations of the present disclosure.

Referring now to FIG. 6, FIG. 6 depicts a flow diagram of an exemplary method (e.g. 600 in FIG. 6) for providing performance indicators of destination documents in accordance with implementations of the present disclosure. The method includes identifying a referral document to a destination document, the referral document comprising a source of at least one visitor to the destination document (e.g. 680 in FIG. 6). As an example, a visitor on visitor device 220 clicks on link 240, which causes an application running on visitor device 220 to visit destination document 234a from referral document 232. Based on the visit, analytics manager 224 identifies referral document 232 to destination document 234a by the URL of referral document 232. Based on the identification, analytics manager 224 attempts to lookup referral document 232 in a referral index in database 228. As the referral index does not include an entry for referral document 232, analytics manager 224 adds the URL of referral document 232 to the referral index, which includes a visit count field that tracks a number of visits to destination document 234a from referral document 232.

The method further includes extracting referral keywords from content of the referral document, the referral keywords corresponding to a referral context of the referral document (e.g. 682 in FIG. 6). For example, based on the aforementioned identification, analytics manager 224 determines that database 224 includes destination context of destination document 234a, but does not include referral context of referral document 232. In response, context extractor 222 extracts referral keywords from portion 242a of content 242. Context extractor 222 limits extraction to text in portion 242a, which is defined based on the text being in a paragraph preceding link 240 through a paragraph following link 240. Natural language processing is performed on the text and a vector of keyword frequencies is generated using a topic model corresponding to destination document 234a. The vector is stored in the referral index.

The method also includes determining a degree of correlation between the referral document and the destination document based on a comparison between the referral keywords and destination keywords, the destination keywords corresponding to destination context of the destination document (e.g. 684 in FIG. 6). Continuing with the example above, contextual correlation analyzer 226 generates a cosine similarity score based on a cosine similarity function that compares the vector of keywords for referral document 232 to a vector of keywords for destination document 234.

The method additionally includes providing one or more performance indicators to a user based on the correlation between the referral document and the destination document, where the one or more performance indicators correspond to a performance metric that quantifies interactions between visitors and the destination document (e.g. 686 in FIG. 6). In the example described above, an analytics report is generated by the analytics tool and is presented to a user on user device 218. The analytics report includes report portion 300b, which includes performance indicators A in column 350b and degrees of correlation in column 354b. Column 350b displays the degree of correlation as 12, which corresponds to the cosine similarity score expressed as a rounded percentage. In addition or instead, report portion 300b includes column 356b, which has a correlation weighted performance indicator that is calculated from the cosine similarity score.

Figure 7:
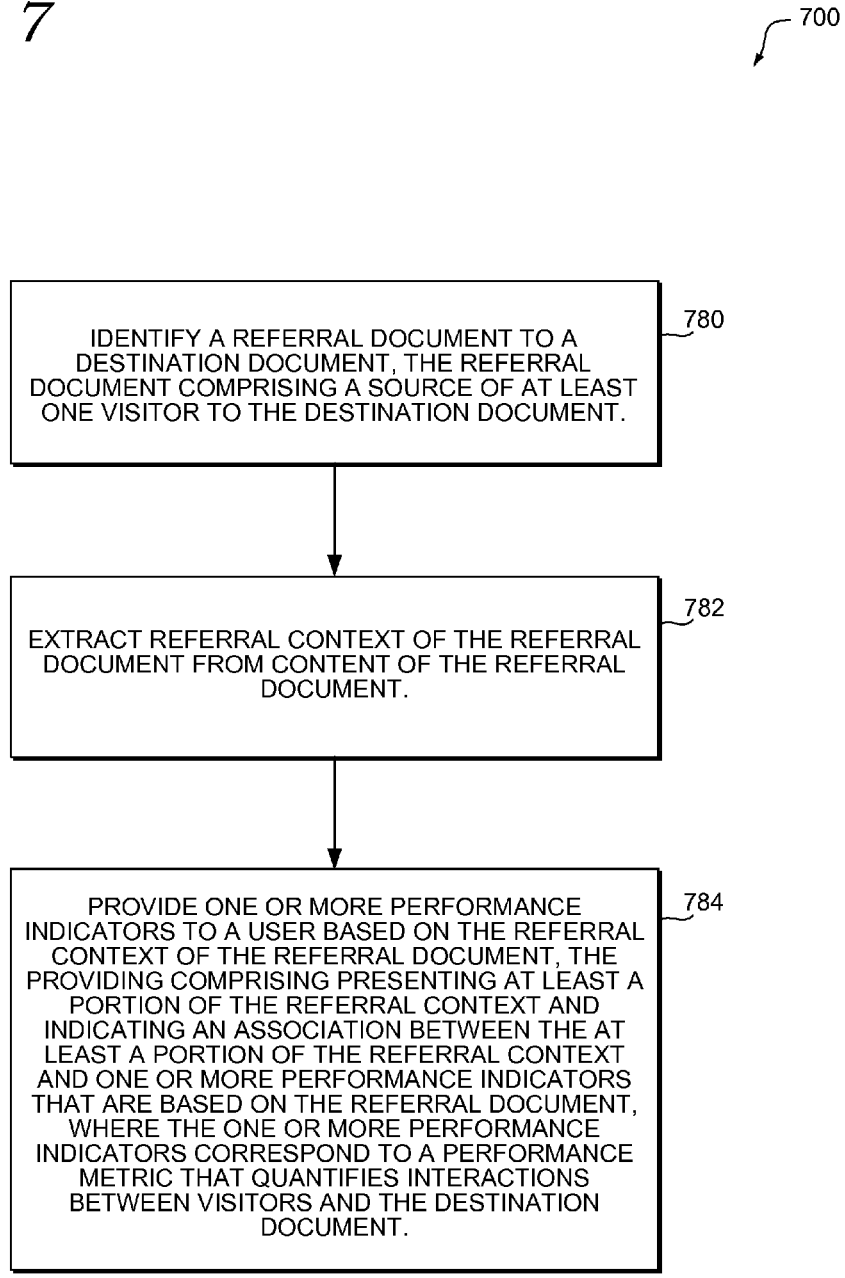
FIG. 7 depicts a flow diagram of an exemplary method for providing performance indicators of destination documents in accordance with implementations of the present disclosure.

Referring now to FIG. 7, FIG. 7 depicts a flow diagram of an exemplary method (e.g. 700 in FIG. 7) for providing performance indicators of destination documents in accordance with implementations of the present disclosure. The method includes identifying a referral document to a destination document, the referral document comprising a source of at least one visitor to the destination document (e.g. 780 in FIG. 7). As an example, a visitor clicks on link 240 of referral document 232, which loads destination document 234a on visitor device 220. Loading destination document 234a updates a browser cookie for destination document 234a on visitor device 220 and seconds the browser cookie to analytics manager 224, which identifies referral document 232 from the browser cookie.

The method also includes extracting referral context of the referral document from content of the referral document (e.g. 782 in FIG. 7). In the example described above, referral context is extracted from the referral document. Context extractor 222 extracts referral context comprising referral keywords and stores the referral keywords or frequencies corresponding to the referral keywords in database 228.

The method additionally includes providing one or more performance indicators to a user based on the referral context of the referral document, the providing comprising presenting at least a portion of the referral context and indicating an association between the at least a portion of the referral context and one or more performance indicators that are based on the referral document, where the one or more performance indicators correspond to a performance metric that quantifies interactions between visitors and the destination document (e.g. 784 in FIG. 7). In the example described above, an analytics report is generated by the analytics tool and is presented to a user on user device 218. The analytics report includes report portion 300b, which includes performance indicators A in column 350b and at least a portion of the referral context in column 362. In particular, column 362 displays referral keywords K(1), which are the referral keywords extracted from referral document 232, such that the user is able to view performance indicators A with context.

Thus, in accordance with implementations of the present disclosure, performance indicators of destination documents can be provided in any of the various manners described above. This can allow for users to effectively and efficiently analyze analytics data. It will be understood that certain features and subcombinations described herein are of utility and may be employed without reference to other features and subcombinations. This is contemplated by and is within the scope of the claims.

The invention claimed is:

1. A computer-implemented method for providing performance indicators of destination documents, the method comprising:
    determining a navigation occurred from a referral document to a destination document based on the referral document comprising a source of the navigation by at least one visitor to the destination document;
    automatically determining that each element of a subportion of content of the referral document is within a designated distance of the source in the content;
    extracting referral keywords from the subportion of content of the referral document, the referral keywords corresponding to a referral context of the referral document;
    determining a degree of correlation between the referral document and the destination document using a similarity score determined from a comparison between the referral keywords and destination keywords extracted from content of the destination document, the destination keywords corresponding to destination context of the destination document, wherein the referral keywords are given higher weight in the degree of correlation than information from the content outside of the subportion based on the referral keywords being from the subportion;
    based on the determining the navigation occurred, recording the navigation as a visit to the destination document;
    selecting the degree of correlation from a plurality of degrees of correlation based on determining the degree of correlation corresponds to the source and the visit is from the source, wherein the plurality of degrees of correlation correspond to different potential sources of visits in the content the referral document;
    determining one or more performance indicators of the destination document, the one or more performance indicators comprising a performance indicator value of the destination document that weights the visit to the destination document by the determined degree of correlation in response to the selecting, and wherein the one or more performance indicators correspond to a performance metric that quantifies interactions between visitors and the destination document, the visitors comprising the at least one visitor; and
    providing, over one or more network communications, the performance indicator value to a user device in an analytics report as analytics data.

2. The computer-implemented method of claim 1, wherein the providing comprises displaying, in the analytics report, the degree of correlation and a number of visits from the referral document that is captured in the performance indicator value.

3. The computer-implemented method of claim 1, wherein the providing comprises displaying, in the analytics report, the performance indicator value and at least a portion of the referral context of the referral document in association with the performance indicator value.

4. The computer-implemented method of claim 1, wherein the providing comprises displaying, in the analytics report, the performance indicator value and at least some of the referral keywords in association with the performance indicator value.

5. The computer-implemented method of claim 1, wherein the analytics report displays the performance indicator value weighting the visit to the destination document by the determined degree of correlation and the performance indicator value without the weighting.

6. The computer-implemented method of claim 1, wherein visits to the referral document are excluded from the performance indicator value based on the degree of correlation.

7. The computer-implemented method of claim 1, further comprising determining a scope of the content of the referral document based a link to the destination document in the referral document.

8. The computer-implemented method of claim 1, wherein the determining the degree of correlation is based on frequencies of the referral keywords as compared to frequencies of the destination keywords.

9. The computer-implemented method of claim 1, wherein the determining the degree of correlation is based on a cosine similarity between the referral keywords and the destination keywords.

10. The computer-implemented method of claim 1, wherein the content of the referral document comprises text of the referral document.

11. The computer-implemented method of claim 1, comprising updating the performance indicator value in response to detecting a visit to the destination document from the referral document.

12. One or more computer-storage media storing computer-useable instructions that, when executed by a computing device, perform a method for providing performance indicators of destination documents, the method comprising:
   determining a navigation occurred from a referral document to a destination document based on the referral document comprising a source of the navigation by at least one visitor to the destination document;
   determining a level of correlation between referral context of the referral document and destination context of the destination document using a similarity score determined from a comparison between the referral context extracted from content of the referral document and the destination context extracted from content of the destination document;
   based on the determining the navigation occurred, recording the navigation as a visit to the destination document; and
   determining one or more performance indicators of the destination document, the one or more performance indicators comprising a performance indicator value of the destination document that weights the visit to the destination document by the determined degree of correlation based on the referral document being the source of the navigation, and wherein the one or more performance indicators correspond to a performance metric that quantifies interactions between visitors and the destination document, the visitors comprising the at least one visitor; and
   providing, over one or more network communications, the performance indicator value to a user device in an analytics report as analytics data.

13. The one or more computer-storage media of claim 12, wherein the performance indicator value excludes visits to the destination document based on the level of correlation.

14. The one or more computer-storage media of claim 12, wherein the providing comprises presenting, in the analytics report, the level of correlation to the user in a table with the performance indicator value.

15. The one or more computer-storage media of claim 12, wherein the performance indicator value is a bounce rate weighted by the level of correlation.

16. The one or more computer-storage media of claim 12, wherein the determining the navigation occurred comprises receiving a network address of the referral document.

17. A computer-implemented method for providing performance indicators of destination documents, the method comprising:
   determining at least one navigation occurred by at least one visitor from a referral document to a destination document, the at least one navigation being caused by at least one user selection of a link in content of the referral document;
   based on the determining the navigation occurred, looking up an entry corresponding to the referral document in a data store, and incrementing a visit count that captures a number of visits to the destination document from the referral document and is tracked in a visit count field of the looked up entry, the incrementing being for each navigation of the at least one navigation that is determined to have occurred;
   extracting referral context of the referral document from a subportion of the content of the referral document, wherein the subportion of the content is determined by automatically analyzing a proximity of each element of the subportion of the content to the link, such that the extracting defines the subportion of the content within a designated distance of the link;
   determining a degree of correlation between the referral document and the destination document using a similarity score determined from a comparison between the extracted referral context and destination context extracted from the destination document; and
   determining one or more performance indicators of the destination document, the one or more performance indicators comprising a performance indicator value of the destination document that weights the incremented visit count in the performance indicator value by the determined degree of correlation based on the link in the referral document being a source of each of the visits captured by the visit count, wherein the one or more performance indicators correspond to a performance metric that quantifies interactions between visitors and the destination document; and
   providing, over one or more network communications, the determined one or more performance indicators to a user device, the providing causing presentation, in an analytics report of a user corresponding to a website provider of the destination document, of an entry for the referral document that includes the performance indicator value as analytics data and at least a portion of the extracted referral context.

18. The computer-implemented method of claim 17, wherein the performance indicator value corresponds to a proportion of the visitors to the destination document that carry out at least one predetermined user action on the destination document.

19. The computer-implemented method of claim 17, wherein the at least a portion of the referral context is presented in a column of a table of the analytics report, the column further presenting at least a portion of referral context from other referral documents to the destination document.

20. The computer-implemented method of claim 17, wherein the at least a portion of the referral context comprises referral keywords.

\* \* \* \* \*

UNITED STATES PATENT AND TRADEMARK OFFICE
CERTIFICATE OF CORRECTION

PATENT NO. : 10,296,924 B2
APPLICATION NO. : 14/445999
DATED : May 21, 2019
INVENTOR(S) : Sachin Soni et al.

Page 1 of 1

It is certified that error appears in the above-identified patent and that said Letters Patent is hereby corrected as shown below:

In the Specification

Column 14, Line 64: Please remove "that that" and replace with --that--.

In the Claims

Column 21, Line 22 Claim 7: After "based" insert --on--.

Signed and Sealed this
Twenty-ninth Day of October, 2019

Andrei Iancu
*Director of the United States Patent and Trademark Office*